United States Patent
Minakawa et al.

(10) Patent No.: US 7,389,050 B2
(45) Date of Patent: Jun. 17, 2008

(54) WAVELENGTH MULTIPLEXER/DEMULTIPLEXING DEVICE

(75) Inventors: Yoshiaki Minakawa, Moriya (JP); Tsuyoshi Maro, Moriya (JP)

(73) Assignee: Hitachi Maxell, Ltd., Osaka (JP)

( * ) Notice: Subject to any disclaimer, the term of this patent is extended or adjusted under 35 U.S.C. 154(b) by 524 days.

(21) Appl. No.: 10/941,866

(22) Filed: Sep. 16, 2004

(65) Prior Publication Data

US 2005/0063423 A1    Mar. 24, 2005

(30) Foreign Application Priority Data

Sep. 18, 2003  (JP) .............................. 2003-326675

(51) Int. Cl.
*H04J 14/02* (2006.01)
(52) U.S. Cl. .............................. 398/85; 398/72; 398/86
(58) Field of Classification Search .................. 398/47, 398/48, 69, 72, 82–87
See application file for complete search history.

(56) References Cited

U.S. PATENT DOCUMENTS

| 2002/0154857 A1* | 10/2002 | Goodman et al. ............. 385/24 |
| 2003/0076559 A1* | 4/2003 | Richard et al. ............. 359/123 |
| 2003/0095744 A1* | 5/2003 | Takano et al. ................ 385/24 |
| 2005/0047724 A1* | 3/2005 | Farr ............................ 385/47 |

FOREIGN PATENT DOCUMENTS

| JP | 8-82711 A | 3/1996 |
| JP | 2000-162413 A | 6/2000 |

OTHER PUBLICATIONS

Yoichi Fujii, "Optical Engineering, pp. 168-169, Agune-shofu-sha, Apr. 15, 1993."

* cited by examiner

*Primary Examiner*—Dzung Tran
(74) *Attorney, Agent, or Firm*—Birch, Stewart, Kolasch & Birch, LLP

(57) ABSTRACT

For use in combining and/or splitting a 3-wavelength multiplexed light, in which if central wavelengths of the three bands are denoted as $\lambda 1$, $\lambda 2$ and $\lambda 3$, in a relation that $0.92 \leq \lambda 2/\lambda 1 \leq 1.08$, $0.20 \leq \lambda 3/\lambda 1 \leq 0.92$ or $1.08 \leq \lambda 3/\lambda 1 \leq 5.00$, the wavelength multiplexing and demultiplexing device comprises two optical filters of different characteristics, supported by one of more optical substrates combined in a single package, wherein, when a 3-wavelength multiplexed light is led to a first filter A for splitting the 3-wavelength multiplexed light into light of a band of $\lambda 3$ and a 2-wavelength multiplexed light of $\lambda 1$ and $\lambda 2$, and when the 2-wavelength multiplexed light is led to a second filter B for splitting the 2-wavelength multiplexed light into light of a band of $\lambda 1$ and light of a band of $\lambda 2$, an optical edge filter is used for the filter A and an optical band-pass filter is used for the filter B.

5 Claims, 4 Drawing Sheets

WAVELENGTH MULTIPLEXER/DEMULTIPLEXING DEVICE

This Non-provisional application claims priority under 35 U.S.C. §119(a) on Patent Application No(s). 2003-326675 filed in Japan on Sep. 18, 2003, the entire contents of which are hereby incorporated by reference.

BACKGROUND OF THE INVENTION

1. Field of the Invention

The present invention relates to a wavelength multiplexing and demutiplexing device.

2. Description of the Related Art

Dielectric multi-layer films are generally used as the anti-reflection films coated on the surfaces of spectacle lenses or as the television color-separation filters coated on glass substrates. With the miniaturizing trend of devices, in color separation filters used in liquid crystal projectors and cameras, etc. or laser detection mirrors used in DVD (Digital Versatile Disk) devices, those models have come to be required which are structured such that a dielectric multi-layer film is held between two prism-shaped glass substrates and a light is incident at an angle on the dielectric multilayer film. In the communications sector, to cope with the huge increase in traffic on the Internet, the introduction of multiple-wavelength transmission technology has been pushed forward and, above all, there is requirement for filters, including a dielectric multilayer film serving as an edge filter or a band-pass filter formed on the glass substrate to separate light of different wavelengths.

In optical communication, by combining 3-terminal modules in cascade, it becomes possible to combine (multiplex) or separate (de-multiplex) light of various wavelengths, but because modules are required as many as the number of waves combined or separated, and the likely results are increases of device cost, area required, and installation cost. As is disclosed in JP-A-8-82711 and "Optical Engineering" by Yoichi Fujii, Agune Shofusha, 1993, pp168-169, modules have been proposed which incorporate a plurality of band-pass filters and edge filters in a single module to thereby combine or separate multiple wavelengths; however, since the beam-splitting angle is small, a problem arises that if one is going to mount a laser for transmission and a diode for reception, it is necessary to secure a long optical path, which leads to increases in device size and installation cost. If one tries to reduce the size of the device, it is necessary to use a laser/diode array, which results in cost increase. If an attempt is made to achieve downsizing without cost increase, it is required to increase the beam-splitting angle, in which case, however, a problem arises that a deviation becomes large between P-wave and S-wave of the output light, which results in a deterioration of the beam multiplexing/demultiplexing characteristics.

To improve the deterioration problem of characteristics which depends on the p-polarized light and the s-polarized light at a high deviation angle, or a high incident angle, in other words, to improve the problem that a considerable deviation occurs in the amplitude wavelength characteristics of the outgoing light depending on the polarizing direction of the incident light, Si is used for the high refractive index layer of a dielectric multilayer filter in JP-A-2000-162413. If a substance with high refractive index, such as Si, Ge, ZnS, ZnSe, for example, is used for the high refractive index layer, the characteristic differences in the amplitude characteristics can be improved, but as disclosed in JP-A-2000-162413, when $TiO_2$ or $SiO_2$ is used for the low refractive-index layer, if left as it stands for a long time at a high temperature of 85° C. and a high relative humidity of 85%, oxygen of $TiO_2$ or $SiO_2$ diffuses to the side of the high refractive-index layer, causing a decrease in the refractive index of the Si or Ge layer, a wavelength shift by a rise of the refractive index of the low refractive-index layer, and changes in the optical characteristics. A problem with ZnS or ZnSe is that because of the low adhesion to $SiO_2$ or $TiO_2$, the ZnS or ZnSe tends to break away.

If the medium of incidence is air with a refractive index of 1, the characteristic differences due to different polarizing directions can be reduced. However, with the optical parts of late, in which the degree of element integration has become very high owing to the trend of miniaturization, the filters are used often in direct contact with other optical parts, such as fiber capillary tubing, prisms or waveguides. In such a case, when air is used as the incident medium, it is necessary to employ the air sandwich structure. If the air sandwich structure is used, it follows therefore that an anti-reflection film is formed to suppress changes in the amplitude due to multiple reflections at the bonding surfaces. Because this anti-reflection film is made optimal to the air with a refractive index of 1, if a resin or the like is allowed to infiltrate to the light transmission surface in a bonding process, the transmission characteristics will deteriorate, and therefore it is required to adopt such a bonding structure as to prohibit an unwanted intrusion of resin, which is another factor of cost increase. Instead of this, if mere resin bonding is used, a decrease in process yield will result.

There is another method which adjusts the planes of polarization of the incident light to eliminate the differences in characteristics due to the different planes of polarization. If any one of the polarized light is extracted by using a polarizer, this results in a decrease in the amount of light. If, after splitting the incident light into an s-polarized light and a p-polarized light and the polarization states are made uniform by converting the s-polarized light into the p-polarized light or the p-polarized light into the s-polarized light, this method makes it necessary to provide a part to convert the planes of polarization, thus increasing the size of the device and raising the cost.

SUMMARY OF THE INVENTION

The present invention has been made with the above situation in mind, and has as its object to provide a multilayer-film filter and an optical part for multiplexing or demultiplexing wavelengths, which has the following features: to improve the deterioration of characteristics depending upon the plane of polarization when multiplexing or demultiplexing light of three or more wavelengths, to reduce the device size and obtain the superior multiplexing/demultiplexing characteristics and the excellent storage characteristics.

The present invention relates to a wavelength multiplexing and demultiplexing device for combining and/or splitting a 3-waveform multiplexed light including three bands of wavelengths, in which if central wavelengths of the three bands are denoted as $\lambda 1$, $\lambda 2$ and $\lambda 3$, they are in a relation that $0.92 \leq \lambda 2/\lambda 1 \leq 1.08$, $0.20 \leq \lambda 3/\lambda 1 \leq 0.92$ or $1.08 \leq \lambda 3/\lambda 1 \leq 5.00$, the wavelength multiplexing and demultiplexing device having two optical filters of different characteristics, supported by one or more optical substrates combined in a single package, wherein, as shown in FIG. 8, when a 3-wavelength multiplexed light is led to a first filter. A 11 for splitting the 3-wavelength multiplexed light 30 into light of a band of $\lambda 3$ (33) and a 2-wavelength multiplexed light 34 of λ1 (31) and λ2 (32), and when the 2-wavelength multiplexed light 34 is led to a second filter B 21 for splitting the 2-wavelength multiplexed light into 34 light of a band of λ1 (31) and light of a band of λ2 (32), by using an optical edge filter for the filter A (11) and an optical band-pass filter for the filter B (21), it is possible to improve the problem that the amplitude wavelength characteristics of the output light incur a deviation between the p-polarized light and the s-polarized light.

The wavelength multiplexing and demultiplexing device according to claim 1, wherein when the filter A (11) reflects the light of the band of λ3 (33) of the 3-wavelength multiplexed light 30, and transmits the 2-wavelength multiplexed light 34 of λ1 (31) and λ2 (32), the filter B (21) reflects the light of the band of λ2 (32) out of the 2-wavelength multiplexed light 34 that has passed through the filter A (11), and transmits the light of the band of λ1 (31), and if the refractive index of the incident medium of the filter A (11) is denoted by nA, the angle formed by the 3-wavelength multiplexed light (30) to the filter A (11) and a line normal to the surface of the filter A (11) is denoted by θA (22) and the refractive index of the incident medium of the filter B (21) is denoted by nB, and an angle formed by the 2-wavelength multiplexed light (34) to the filter B (21) and a line normal to the surface of the filter B (21) is denoted by θB (22), preferably θA≧15° and nA•sin θA≦0.95 and θB≧15° and nB•sin θ≦0.85.

If the angle formed by the filter A (11) and the filter B (21) is denoted by α (23), 60°≦α≦120°. If the angle θA (12) is smaller than 15°, an angle difference between the 3-wavelength multiplexed light (30) and a transmitting light of 1310 nm is small, so that the component elements are to be mounted so close to each other and it is difficult to arrange those elements and therefore the θA (12) is preferably not less than 15°. On the other hand, if the θA (12) is large, the incident angle to the filter A (11) becomes large, and therefore the reflectance factor of the p-polarized light at the edge filter coated on the filter A (11) is low. By study by the present writer, et al., it has been clarified that the upper limit of the θA (12) is related to the refractive index nA of a substrate A (10), and unless nA•sin θA is 0.95 or smaller, a sufficient reflectance factor cannot be secured for the p-polarized light.

Therefore, the smaller the nA is, the larger the degree of freedom in designing θA (12) becomes, and if the θA (12) is the same, the lower the nA is, the larger the reflectance factor for the p-polarized light becomes, and for this reason, the nA should preferably be low. The incident angle θA (12) is preferably 20° or larger, and the nA•sin θA is preferably 0.8 or lower. If the medium of light output of the filter A (11) and the incident medium of the filter B (21) are both air, the α (23) to find the angle of incidence θB (22) can be obtained by an equation (1) as follows.

$$\alpha = \theta B + \arcsin(nA \cdot \sin \theta A) \quad (1)$$

Therefore, if a refractive index nA of the substrate A (10) and an incident angle θA (12) to the filter A (11) are set, the angle α (23) formed by the filter A (11) and the filter B (21) to obtain a desired θB (22) can be calculated. According to the present writer, et al., the effective range of α is 60°≦α≦120°, more preferably, 70°≦α≦100°.

As materials for high-refractive-index films in the present invention, there is at least one kind selected from oxides of Ta, Ti, Ce, Hf, Zr, Nb, Y, Cr, etc., nitrides of Si and Ge, etc., carbides of Si etc., semiconductors, such as ZnS, ZnSe, GaP, InP, GaAs, GaAl, and GaN, and compounds of those materials. As materials for low-refractive-index films, there is at least one kind selected from oxides of Si, Al, Mg, Ge, etc., fluorides of Ca, Ba, Ce, Mg, Na, Nd, $Na_5Al_3F_{14}$, $Na_3AlF_6$, and compounds of those materials. Note that films of those refractive-indexes of the same kind should preferably be used, but some of the films may be substituted by a refractive-index film of another material if this other material has a similar refractive index. To secure a better storage property under a high-temperature and high-humidity environment, it is desirable to use oxide, nitride, carbide, or fluoride for the material.

The dielectric multilayer film filter in the present invention is manufactured by the vacuum deposition technology. In the category of the vacuum deposition technology, many methods may be used, such as vacuum evaporation, sputtering, chemical vapor deposition, and laser ablation. When using vacuum evaporation, it is effective to use the ion plating process which ionizes part of a vapor flow to improve film quality, and apply a bias to the substrate side, or the cluster ion beam process, or the ion assist evaporation process which irradiates ions to the substrate with additional ion guns. For sputtering, DC reactive sputtering, RF sputtering or ion-beam sputtering, for example, can be used. In the category of chemical vapor deposition, there are plasma polymerization, optical assist vapor deposition, thermal decomposition, and metal organic chemical vapor deposition. Refractive-index films can be formed to a desired thickness by varying the evaporation duration in forming the film.

Besides optical and crystallized glasses, such as quartz glass, borosilicate glass, etc., if the substrate is transparent in the working bands, any material can be used for the substrate, such as semiconductor substrates made from Si wafer, GaAs wafer, GaIn wafer, SiC wafer, etc., monocrystals and polycrystals of oxides, such as $LiNbO_3$, $LiTaO_3$, $TiO_2$, $SrTiO_3$, $Al_2O_3$, MgO, substrates of monocrystals and polucrystals of fluorides, such as $CaFe_2$, $MgF_2$, $BaF_2$, LiF, substrates of monocrystals and polycrystals of chlorides and bromides, such as NaCl, KBr, KCl, plastics, such as acryl, amorphous polyolefin, and polycarbonate, etc.

According to the present invention, it is possible to provide a wavelength multiplexer/demultiplexer device, of low cost and superior characteristics, for multiplexing and demultiplexing a 3-wavelength multiplexed light 30 in three bands into signal light beams.

Other objects, features and advantages of the invention will become apparent from the following description of the embodiments of the invention taken in conjunction with the accompanying drawings.

DESCRIPTION OF THE EMBODIMENTS

Figure 1:
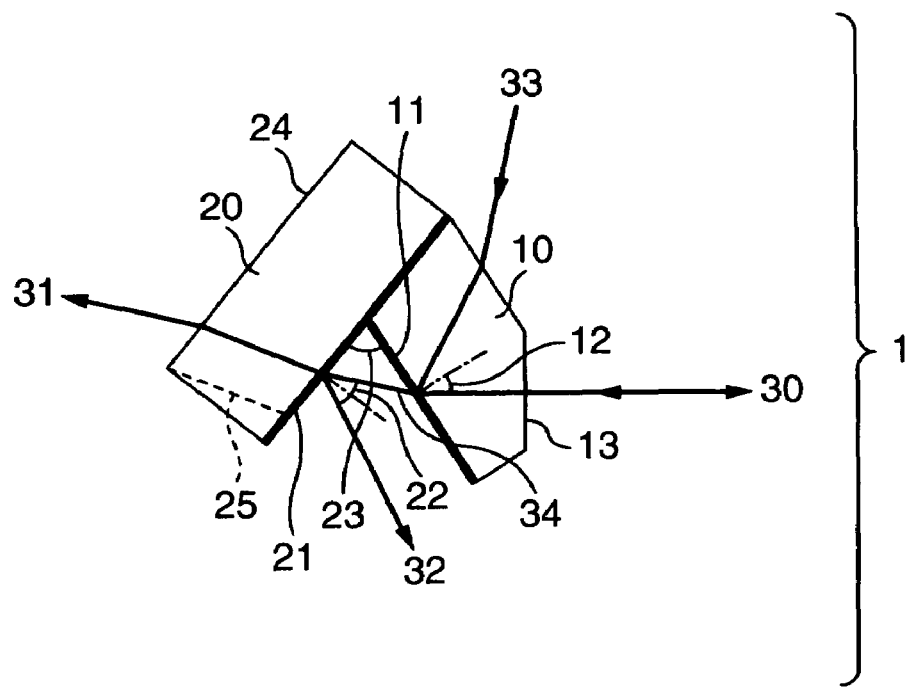
FIG. 1 is a diagram showing a wavelength multiplexing and demultiplexing device.

Embodiments of the present invention will be described with reference to the accompanying drawings, but the present invention is not limited to those embodiments. For the materials of the filter described with reference to embodiments, oxide of Si with a refractive index of 1.46 and oxide of Nb with a refractive index of 2.21 were used and for the substrate, quartz glass (refractive index: 1.44) was used. The refractive index of air was set at 1.00.

The bands used by the wavelength multiplexing and demultiplexing device according to this embodiment are as shown in Table 1.

TABLE 1

| Code | Wavelength (nm) | Central wavelength (nm) | Signal direction |
|------|-----------------|-------------------------|------------------|
| $\lambda 1$ | 1540~1560 | 1550 | Reception |
| $\lambda 2$ | 1480~1500 | 1490 | Reception |
| $\lambda 3$ | 1260~1360 | 1310 | Transmission |

The band of $\lambda 1$ (31) is used to receive light in the range of 1540~1560 nm, and its central wavelength is 1550 nm. The band of $\lambda 2$ (32) is used to receive light in the range of 1480~1500 nm, and its central wavelength is 1490 nm. The band of $\lambda 3$ (33) is used to transmit light in the range of 1260~1360 nm, and its central wavelength is 1310 nm. Among the central wavelengths of the respective bands used, there is the relation of $\lambda 2/\lambda 1=0.96$ and $\lambda 3/\lambda 1=0.85$.

Embodiment 1

In a wavelength multiplexing and demultiplexing device handling the three bands in the relation as shown in Table 1, it is necessary to use a device structure such that the mutually close bands of $\lambda 1$ (31) and $\lambda 2$ (32) and the isolated band of $\lambda 3$ (33) can be handled effectively. Generally, when separating the two close bands in the relation of $0.92 \leq \lambda 2/\lambda 1 \leq 1.08$, rather than an optical edge filter, it is desirable to use an optical band-pass filter because the transition range in transmission or reflection can be made sharp.

However, it has been clarified that when the band of $\lambda 3$ (33) distant from the bands of $\lambda 1$ (31) and $\lambda 2$ (32) was applied to an optical band-pass filter such as this, it was difficult to obtain a large transmittance factor and a large reflectance factor, so that the characteristics could not be made stable.

On the other hand, an optical edge filter is suitable to split light of bands of two remote wavelengths, and makes it possible to set a very wide transmission band. However, when one is going to split two close wavelengths, a filter film of multiple layers is required, and the edge filter is not suitable because it requires a multilayer-film structure, which makes its-manufacture difficult. For this reason, the present inventors came to a conclusion that to separate light into a light component of two close wavelengths $\lambda 1$ (31) and $\lambda 2$ (32) and a light component of wavelength $\lambda 3$ (33) as shown in Table 1, an optical edge filter is used previously to separate out $\lambda 3$ (33), and the remaining $\lambda 1$ (31) and $\lambda 2$ (32) are led to an optical band-pass filter to split them here, the idea which would realize a wavelength multiplexing and demultiplexing device low in cost and excellent in performance.

FIG. 1 is a diagram showing an example of the wavelength multiplexing and demultplexing device according to the present invention, designed to realize the above-mentioned idea. The wavelength multiplexing and demultiplexing device is made with an angle $\alpha$ (23) formed by fixing two optical substrates, substrate A (10) and substrate B (20), in a V-shape by adhesive bonding, for example. The filter A (11) is disposed on the inner surface of the substrate A (10) facing the V-shape space, and the filter B (21) is attached to the inner surface of the substrate B (20) facing the V-shape space, and the filter A (11) and the filter B (21) are put together when the substrates A (10) and B (20) are fixed. The 3-wavelength multiplexed light (30) as the incident and outgoing light has the band of $\lambda 3$ (33) separated by the filter A (11), and the 2-wavelength multiplexed light (34) as the band of Al (31) and $\lambda 2$ (32) as the remainder after the separation is led to the filter B (21), by which light of the band of $\lambda 1$ (31) and light of the band of $\lambda 2$ (32) are separated.

The long-wave-transmission type optical edge filter is disposed as the filter A (11), and an optical band-pass filter is disposed as the filter B (21). In FIG. 1, the filter B (21) is placed at the bonding surface of the substrate A (10) and the substrate B (20), but the filter B (21) need not necessarily be placed at this bonding surface. The filters A (11) and B (21) are formed on the substrates by vacuum deposition mentioned earlier.

A ground-down surface A (13) is provided on the substrate A (10) to make a 3-wavelength multiplexed light (30) easily incident thereon, but this ground-down surface A (13) need not necessarily be required. If the ground-down surface A (13) is provided, the ground-down surface A (13) can be perpendicular to or tilted one to ten degrees from the 3-wavelength multiplexed light (30). A 3-wavelength multiplexed light as a transmitting light (30) or a receiving light to be coupled to the wavelength-multiplexing and demultiplexing device 1 is injected to or emitted from the ground-down surface A (13). To guide a 3-wavelength multiplexed light (30) coming from an optical fiber, for example, there is a method which supplies a parallel light by converting the incident light into a parallel light by a collimator lens or the like, or a method which has an optical-fiber ferrule fixed to the ground-down surface A (13) by adhesive bonding or by fusion, for example, and which guides a diffused light with a divergence angle determined by NA (Numerical Apertuer) of the optical fiber to the filter A (11).

The 3-wavelength multiplexed light (30) as an input/output signal light is set so as to be incident at an angle of $\theta A$ (12) to the normal line to the filter A (11). At this time, light of the band of 1550 nm and the band of 1490 nm out of the 3-wavelength multiplexed light (30) passes through the filter A (11) and is guided to the filter B (21). If light of the band of 1310 nm arrives mixed in the 3-wavelength multiplexed light (30), this light is reflected when it is incident on the filter A (11) at the angle $\theta A$ (12) and emerges from the substrate A (10). The light of the band of 1310 nm used for transmission is oriented so that it passes through the optical substrate A (10) and it is incident on the filter A (11) at the angle $\theta A$ (12), and, after reflected at the angle $\theta A$ (12), it is again injected into the optical fiber from which the 3-wavelength multiplexed light came.

If the angle $\theta A$ (12) is smaller than 15°, an angle difference between the 3-wavelength multiplexed light and a transmitting light (30) of 1310 nm becomes small, so that the respective elements are located so close to each other that their arrangement become difficult; therefore, the θA (12) should preferably be 15° or larger. On the other hand, if a large angle θA (12) is set, the incident angle to the filter A (11) becomes large, so that the p-polarized-light reflectance of the edge filter coated on the filter A (11) decreases.

According to this study, it has been made clear that the upper limit of the θA (12) is related to the refractive index nA of the substrate A (10), unless the nA•sin θA is 0.95 or lower, a sufficient reflectance factor cannot be obtained for the p-polarized light. Therefore, the smaller the nA is, the larger the degree of freedom in designing θA (12) becomes, and if the θA (12) is the same, the lower the nA is, the larger the reflectance factor for the p-polarized light becomes, and for this reason, the nA should preferably be low. The incident angle θA (12) is preferably 20° or larger, and the nA•sin θA is preferably 0.8 or lower.

In this embodiment, the optical substrates are made of quartz, and the θA (12) is set at 30°. Therefore, nA•sin θA=0.72. Transmitting light of the band of 1310 nm is preferable because when the p-polarized light is incident on the substrate, it can reduce the reflection on the surface of the substrate, which contributes to a decrease in transmission loss.

Because a transmitting light of the band of 1310 nm is refracted at the surfaces of the substrate A (10) and then falls on the filter B (21), it is necessary to decide the incident angles of the transmitting light to the surfaces of the substrates by assuming the respective angles. Therefore, the smaller the variation in the refractive index nA of the substrate A (10) is, the better. If it is necessary to assume some variation in the nA, the reverse side of the filter A (11) should be positioned so as to be perpendicular to the incoming beam of the transmitting light, by which it becomes possible to reduce the variation in the incident angle of the transmitting light caused by the variation in the refractive index of the substrate A (10).

Meanwhile, the 2-wavelength multiplexed light (34) comprising the band of 1550 nm and the band of 1490 nm that emerge from the filter A (11) is incident on the filter B (21) at an angle θB (22) formed with the normal line to the filter B (21). By using an optical band-pass filter, which transmits either the band of 1550 nm or the band of 1490 nm and reflects the other band, for the filter B (21), it is possible to split the 2-wavelength multiplexed light 34. In this embodiment, the band-pass filter was designed so as to transmit light of the band of 1550 nm and reflect light of the band of 1490 nm.

If the angle θB 22 is smaller than 15°, an angle difference between the 3-wavelength multiplexed light (30) and the light of λ2 (32) also becomes small, it becomes difficult to arrange the elements and therefore the θB (22) should preferably be 15° or larger. On the other hand, if a large angle θB (22) is set, the incident angle to the filter B (21) becomes large, so that the characteristics of the band-pass filter coated on the filter B (21) deteriorate. According to study by the present writer et al., it has become clear that the upper limit of the θB (22) is related also to the refractive index nB of the incident medium of the filter B (21), and unless the nB•sin θA is made 0.85 or smaller, it is difficult to make flat the characteristics of the transmission band of the band-pass filter and it is impossible to obtain a sufficient value of the reflectance factor for the p-polarized light. The smaller the refractive index nB of the incident medium of the filter B (21) is, the larger the degree of freedom in designing the θB (22) becomes and the more it becomes possible to achieve the flatness of the transmission band of the filter B (21) and a higher reflectance factor for the p-polarized light of the reflection band; therefore, it is preferable that the refractive index nB of the incident medium of the filter B (21) is small. The incident angle θB (22) is preferably 20° or larger, and the nB•sin θB is preferably 0.7 or less. In this embodiment, because the incident medium of the filter B (21) is air, nB=1, and if the θB is 30°, nB•sin θB is 0.5.

As in this embodiment, if the incident medium of the filter A (11) and the incident medium of the filter B (21) are both air, the α (23) by which to obtain the incident angle θB can be obtained by the equation (1).

Therefore, If a refractive index nA of the substrate A (10) and an incident angle θA to the filter A (11) are set, the angle α (23) formed by the filter A (11) and the filter B (21) to obtain a desired θB (22) can be calculated. According to study by the present writer et al., the effective range of α is 60°≦α≦120° and more preferably 70°≦α≦100°.

In this embodiment, since θA=30° and nA=1.44, the α is set to be 76.1° in order that the θB is 30°, where nB•sin θB=0.5.

In this embodiment, the incident medium of the filter A (11) and the incident medium of the filter B (21) are not air, but by placing an optical material, such as another optical substrate, for example, at the plane of emission (output) of the filter B (21), the incident medium of the filter B (21) can be made different from that of the filter A (11), in which case the angle of the θB (22) can be varied in accordance with the refractive index or the shape of the optical material to be placed there.

It often happens that out of the light of the band of λ1 (31) that-has passed through the filter B (21), light at a rate of several percents of the reflectance factor is reflected from the reverse surface, passes through the filter B (21), and comes out in the direction of λ2 (32), and if light of the band of λ1 (31) enters the λ2-light detecting element, this may give rise to a crosstalk. If this crosstalk is a problem, an AR coat may be applied to the reverse side B (24), or otherwise, the substrate B (20) may be cut as indicated as a ground-down surface B (25) with such a surface roughness as to scatter the light reflected by the reverse surface B (24). As remedial measures, both of them are effective, and a less expensive method may be selected.

Note that the refractive index of the substrate B (20) affects the output angle of λ1 (31) as light of the 1550 nm band. If the variation in the refractive index of the substrate B (20) is large, the output angle of λ1 (31) will vary, so that a material with a little variation in the refractive index should desirably be used for the substrate B (20). The value of the refractive index of the substrate B (20) matters little because it does not affect the characteristics of the filter A (11) and the filter B (21). However, if the AR coat is not applied to the reverse surface B (24), the refractive index of the substrate B is preferably low to reduce the reflection at the reverse surface B (24).

Figure 4:
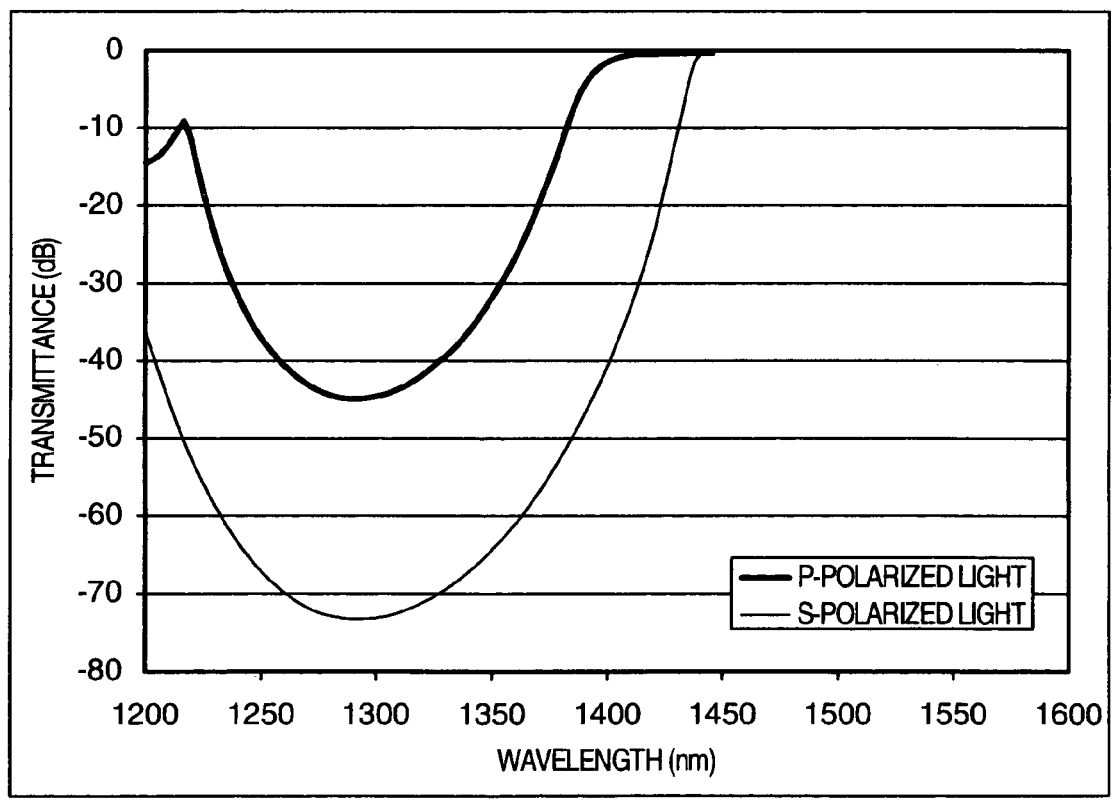
FIG. 4 is a diagram showing the characteristics of an optical edge filter.

FIG. 4 shows the characteristics of a long-wave transmission type edge filter used for the filter A (11) in this embodiment. The incident medium is quartz (refractive index 1.44), the incident angle θA is 30°, and the output medium is air. The low-refractive-index material used was oxide of Si with a refractive index of 1.46 and the high-refractive-index material was oxide of Nb with a refractive index of 2.21.

Figure 5:
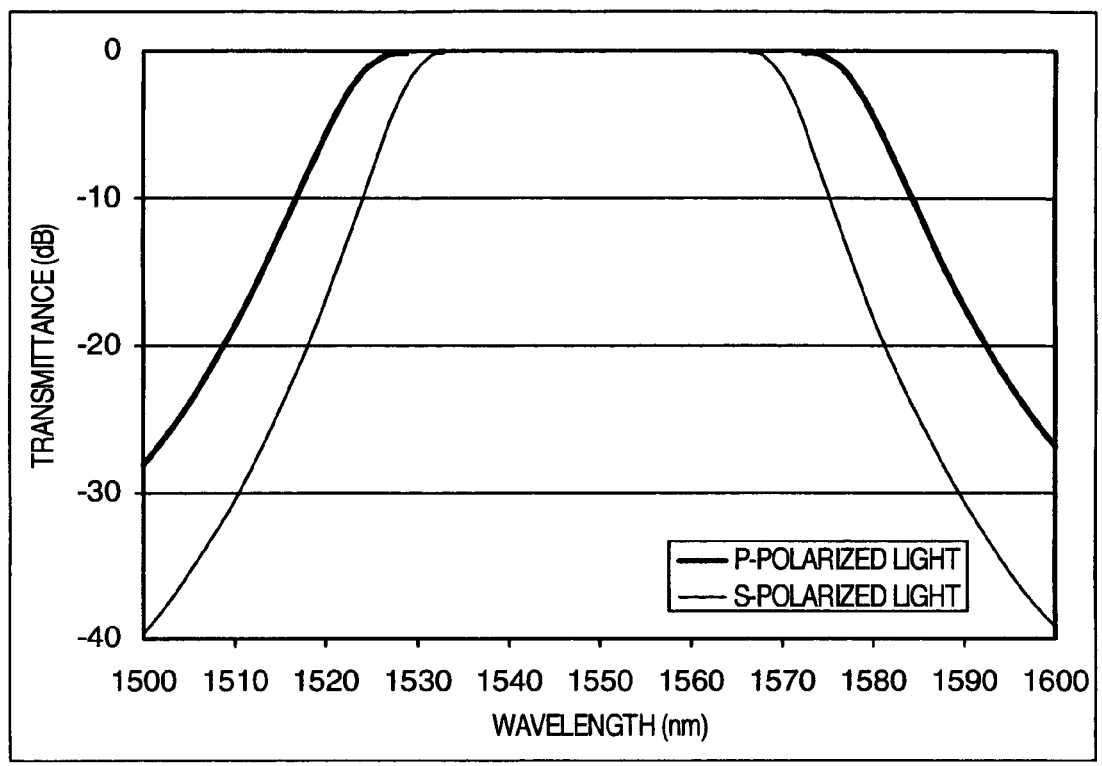
FIG. 5 is a diagram showing the characteristics of an optical band-pass filter.

FIG. 5 shows the characteristics of the optical band-pass filter used for the filter B (21) in this embodiment. The incident medium was air, the incident angle θA (12) was 30°, the output medium was quartz, the high-refractive-index material was oxide of Nb, and the low-refractive-index material was oxide of Si. The refractive indexes of the materials used were: 2.21 for the high-refractive-index film, 1.46 for the low-refractive-index film, and 1.44 for quartz.

Figure 6:
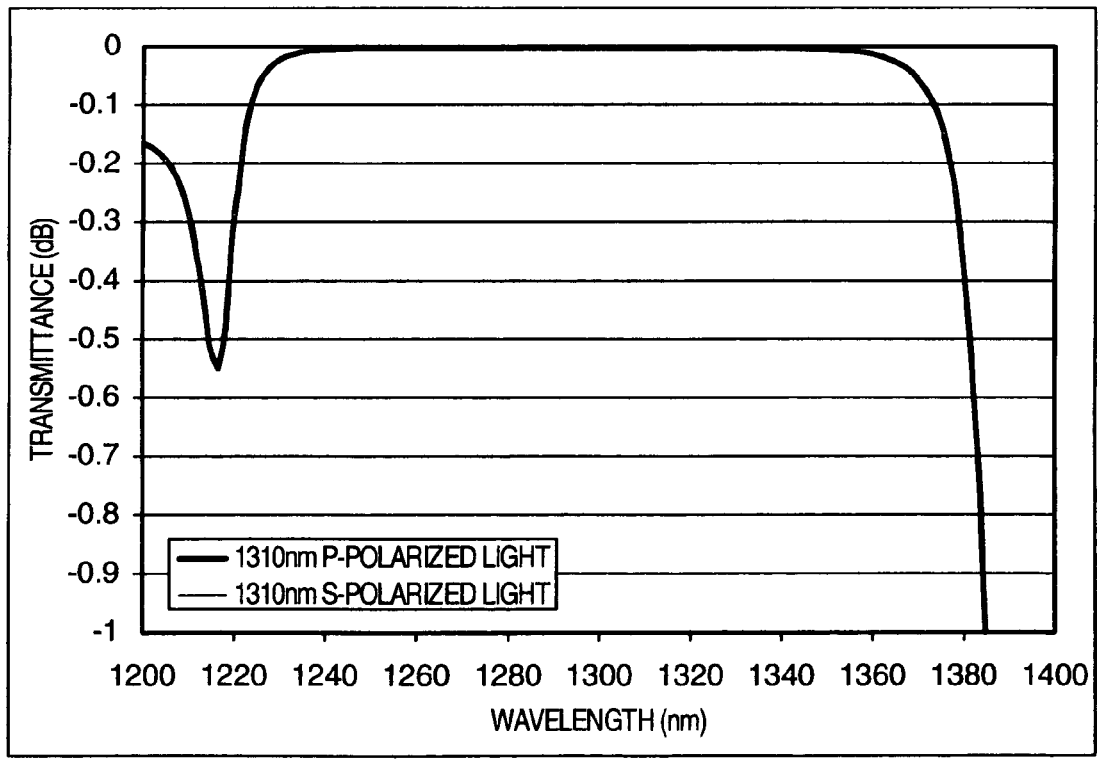
FIG. 6 is a diagram showing the characteristics of a transmitting signal of the wavelength multiplexing and demultiplexing device.

FIG. 6 shows the characteristics of transmitting signals of the band of 1310 nm with the wavelength-multiplexing and demultiplexing device according to this embodiment. In the range of 1260 nm~1360 nm of the band used, the transmission loss was low with both the p-polarized light and the s-polarized light, a fact which asures the excellent wavelength demultiplexing characteristics. Meanwhile, the transmission loss for the s-polarized light was running at almost 0 dB.

Figure 7:
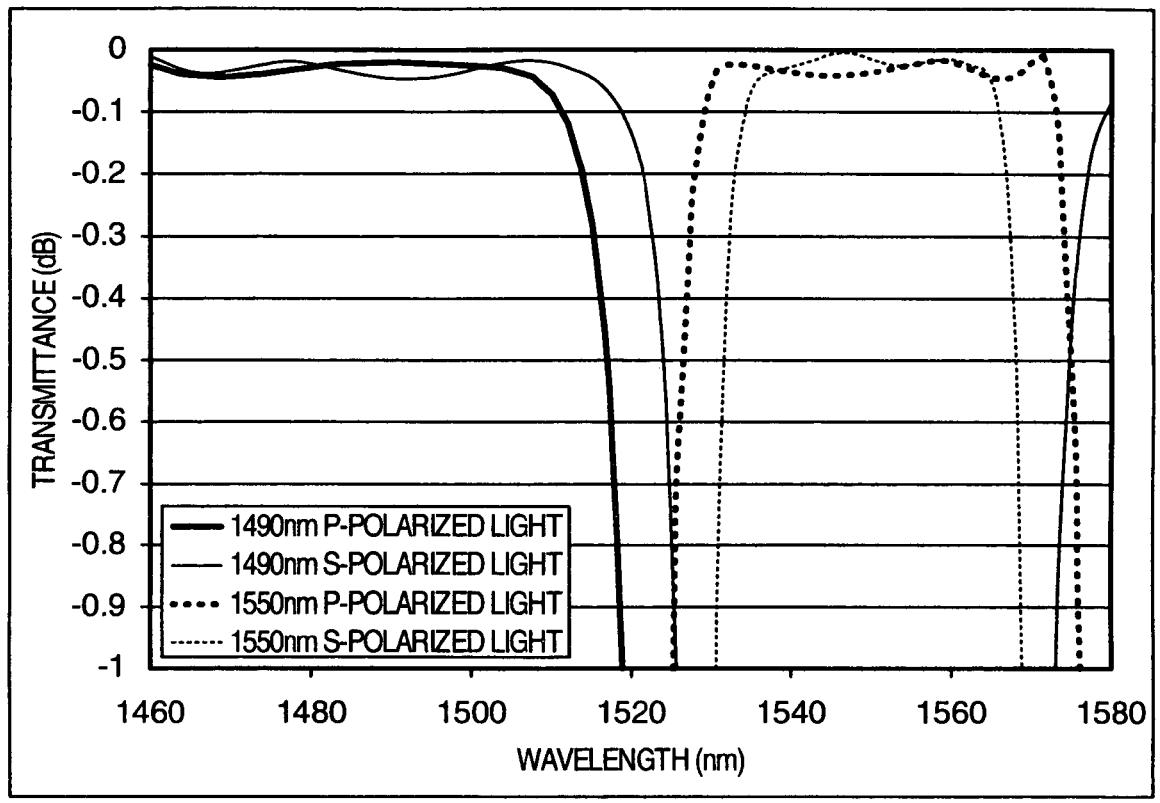
FIG. 7 is a diagram showing the characteristics of a receiving signal of the multiplexing and demultiplexing device.
Figure 8:
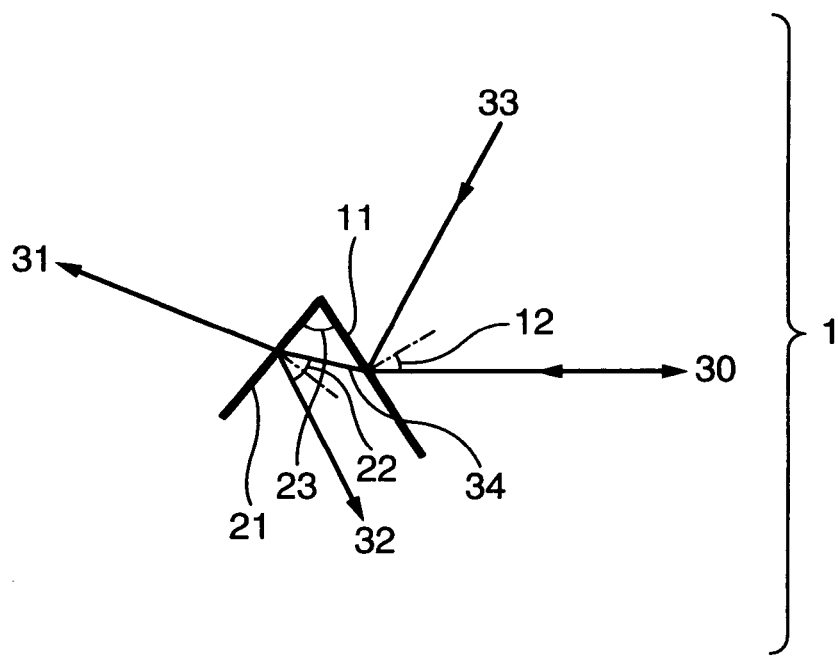
FIG. 8 is a diagram showing a wavelength multiplexing and demultiplexing device.

FIG. 7 shows the characteristics of receiving signals of the bands of 1490 nm and 1550 nm with the wavelength multiplexing and demultiplexing device in this embodiment. Both the p-polarized light and the s-polarized light show low transmission losses in the 1480 nm-1300 nm range with a receiving light of 1490 nm and in the 1540 nm-1560 nm range with a receiving light of 1550 nm, which endorses excellent beam demultiplexing characteristics.

Embodiment 2

Figure 2:
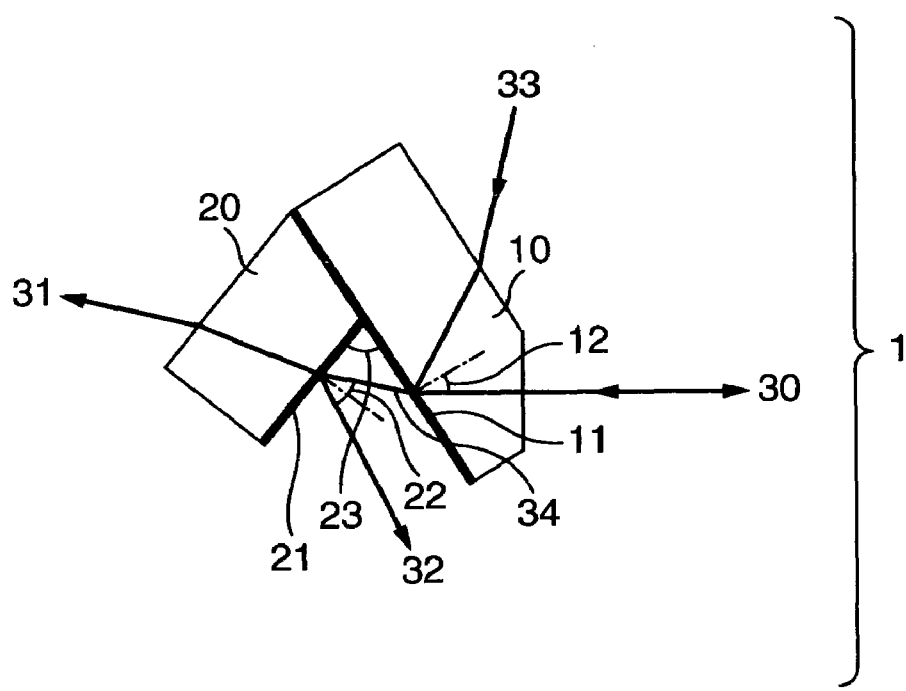
FIG. 2 is a diagram showing a wavelength multiplexing and demultplexing device.

FIG. 2 shows another example of embodying the present invention. The device is optically exactly the same as the one in FIG. 1, with one exception that the way the V-shape assembly is formed. Therefore, in the second embodiment, the same optical characteristics as in the first embodiment can be obtained.

Embodiment 3

Figure 3:
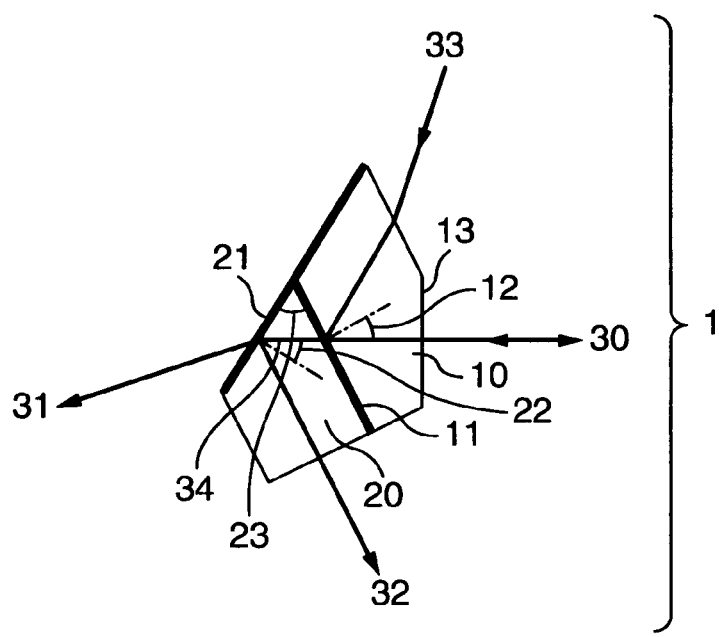
FIG. 3 is a diagram showing a wavelength multiplexing and demultiplexing device.

FIG. 3 shows yet another example of embodying the present invention.

The substrate A (10) was made of quartz, the incident angle to the filter A (11) was 30°, the substrate B (20) was made of quartz, the incident angle to the filter B (21) was 30°, and the angle α formed by the filter A (11) and the filter B (21) was 60°.

Also in the third embodiment, the effects equivalent to those in the first and second embodiments can be obtained.

The present invention can be applied to a wavelength multiplexing and demultiplexing device for combining or splitting light of three different wavelengths.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wavelength multiplexing and demultiplexing device for combining and/or splitting a 3-wavelength multiplexed light, including three bands of wavelengths,
   in which if central wavelengths of said three bands are denoted as $\lambda 1$, $\lambda 2$ and $\lambda 3$,
   $\lambda 1$ and $\lambda 2$ are relatively close in value,
   $\lambda 3$ is isolated from $\lambda 1$ and $\lambda 2$, and
   said bands are configured to satisfy following conditions where:
   $0.92 \leq \lambda 2/\lambda 1 \leq 1.08$, and
   $0.20 \leq \lambda 3/\lambda 1 \leq 0.92$ or $1.08 \leq \lambda 3/\lambda 1 \leq 5.00$,
   said wavelength multiplexing and demultiplexing device comprises
   an optical edge filter,
   an optical band-pass filter, and
   at least one optical substrate to support the optical edge filter and/or the optical band-pass filter,
   wherein said 3-wavelength multiplexed light is led to the optical edge filter for splitting said 3-wavelength multiplexed light into light of a band of $\lambda 3$ and a 2-wavelength multiplexed light of $\lambda 1$ and $\lambda 2$, and said 2-wavelength multiplexed light subsequently passes to the optical band-pass filter for splitting said 2-wavelength multiplexed light into light of a band of $\lambda 1$ and light of a band of $\lambda 2$.

2. The wavelength multiplexing and demultiplexing device according to claim 1, wherein when said optical edge filter reflects the light of said band of $\lambda 3$ which is in a reflective wavelength band of said optical edge filter of said 3-wavelength multiplexed light, and transmits said 2-wavelength multiplexed light of $\lambda 1$ and $\lambda 2$ which are in a transmissive wavelength band of said optical edge filter, said optical band-pass filter reflects the light of said band of $\lambda 2$ which is in a reflective wavelength band of said optical band-pass filter out of said 2-wavelength multiplexed light that has passed through the optical edge filter, and transmits the light of said band of $\lambda 1$ which is in a transmissive wavelength band of said optical band-pass filter.

3. The wavelength multiplexing and demultiplexing device according to claim 2, wherein if the refractive index of the incident medium of said optical edge filter is denoted by nA, the angle formed by said 3-wavelength multiplexed light to the optical edge filter and a line normal to the surface of said optical edge filter is denoted by θA and the refractive index of the incident medium of the optical band-pass filter is denoted by nB, and an angle formed by said 2-wavelength multiplexed light to said optical band-pass filter and a line normal to the surface of said band-pass filter is denoted by θB, then $\theta A \geq 15°$ and $nA \cdot \sin \theta A \leq 0.95$ and $\theta B \geq 15°$ and $nB \cdot \sin \theta B \leq 85$.

4. The wavelength multiplexing and demultiplexing device according to claim 3, wherein if an angle formed by said optical edge filter and the band-pass filter is denoted by α, then $60° \leq \alpha \leq 120°$.

5. A wavelength multiplexing and demultiplexing device according to claim 1, wherein said wavelength multiplexing and demultiplexing device is a wavelength multiplexing and demultiplexing device for optical communication, light in $\lambda 3$ wavelength band separated by said optical edge filter is used for data transmission, and light in $\lambda 1$ wavelength band and $\lambda 2$ wavelength band separated by said optical band pass filter is used for reception of data.

* * * * *